Figure 1:
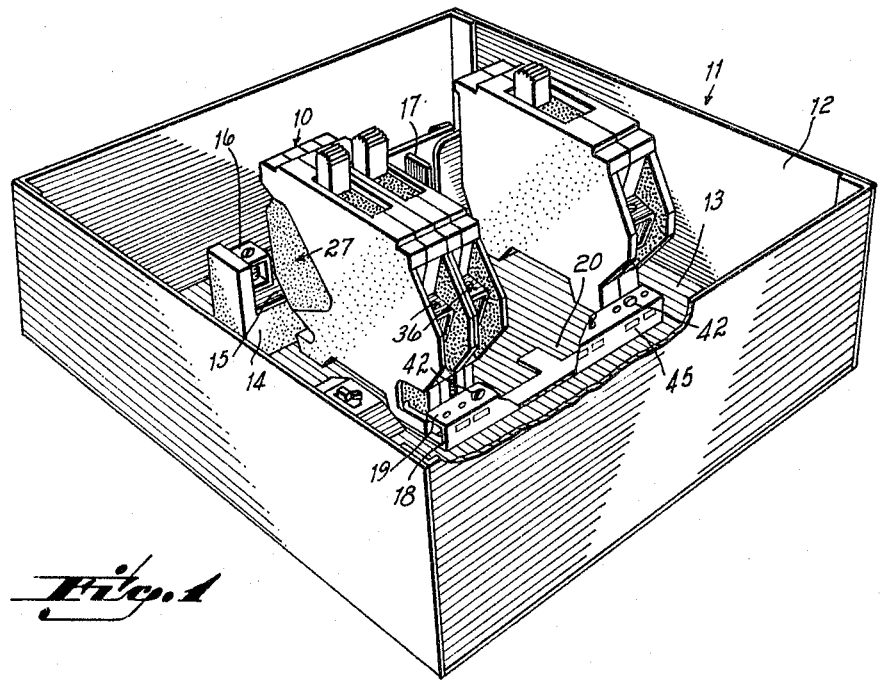

Nov. 29, 1966     W. H. MIDDENDORF     3,289,049
CIRCUIT BREAKERS

Filed April 1, 1964     3 Sheets-Sheet 1

INVENTOR.
William H. Middendorf
BY
Wood, Herron & Evans
ATTORNEYS

Nov. 29, 1966    W. H. MIDDENDORF    3,289,049
CIRCUIT BREAKERS
Filed April 1, 1964    3 Sheets-Sheet 2
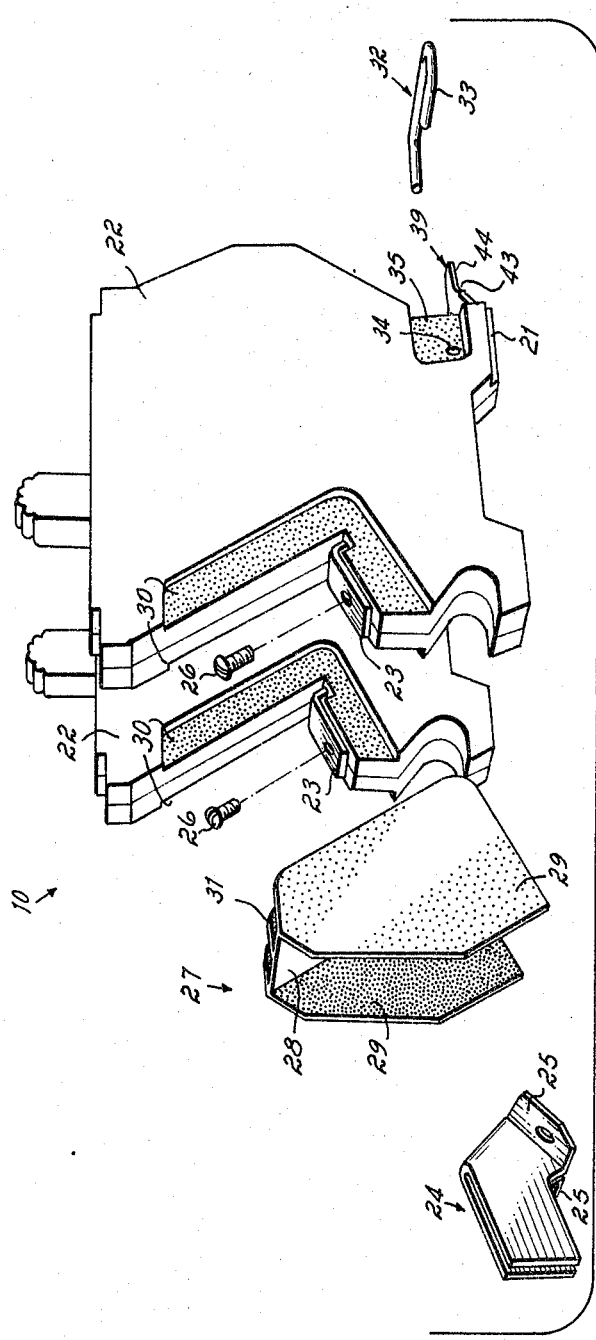
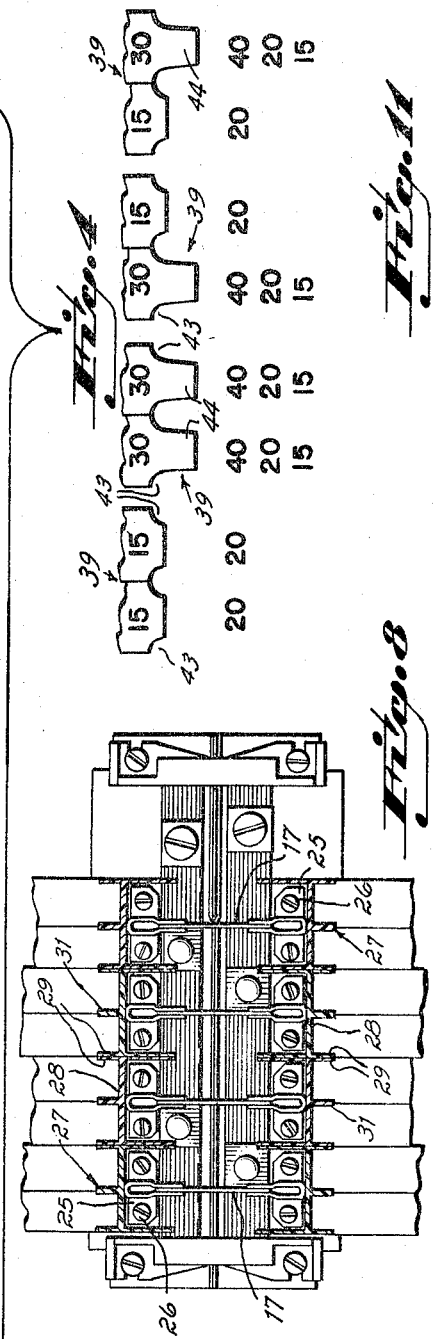
INVENTOR.
William H. Middendorf
BY
Wood, Herron & Evans
ATTORNEYS Nov. 29, 1966  W. H. MIDDENDORF  3,289,049
CIRCUIT BREAKERS
Filed April 1, 1964  3 Sheets-Sheet 3
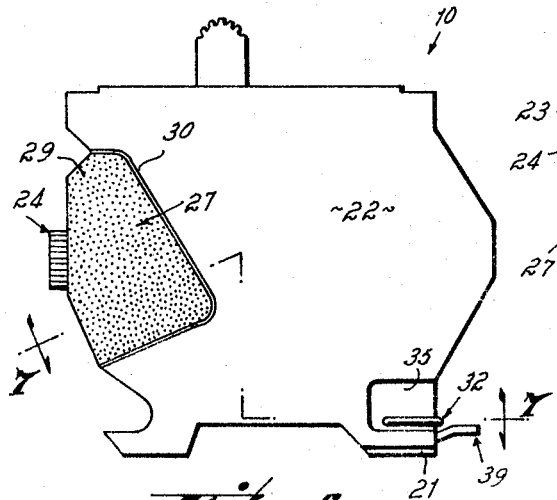
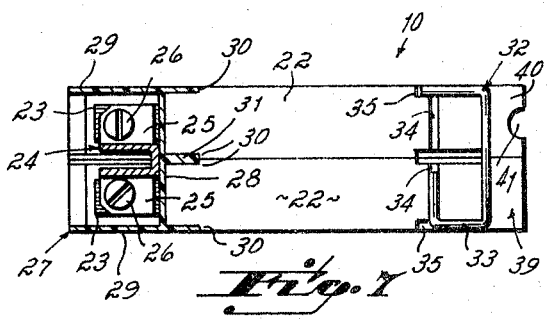
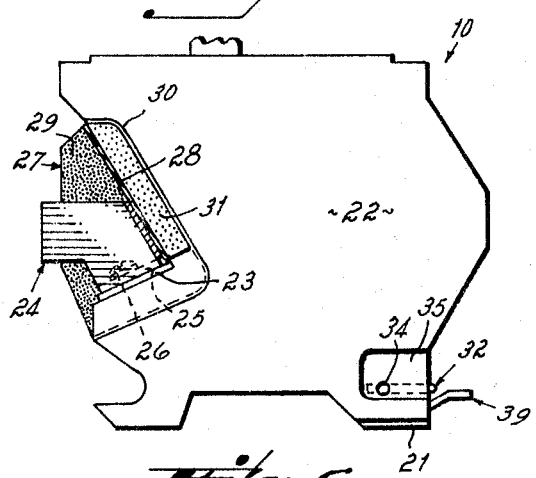
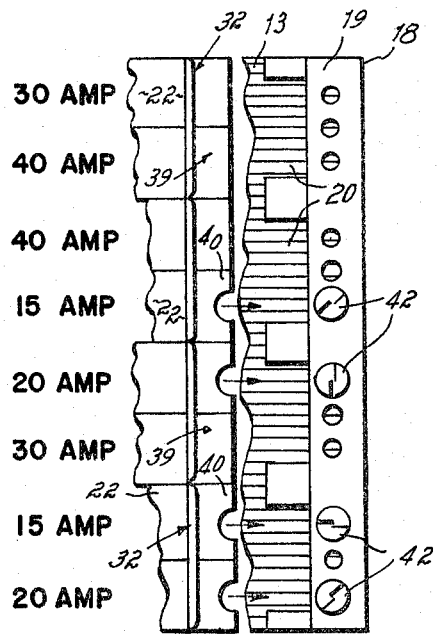
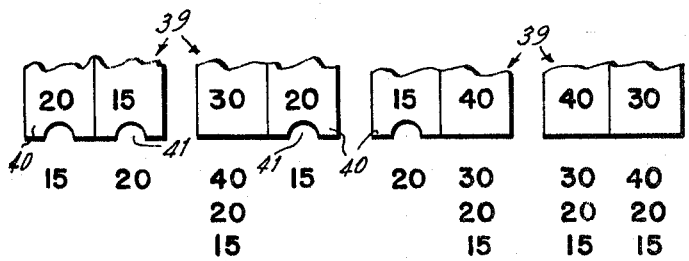
INVENTOR.
William H. Middendorf
BY
Wood, Herron & Evans
ATTORNEYS

United States Patent Office 3,289,049
Patented Nov. 29, 1966

3,289,049
CIRCUIT BREAKERS
William H. Middendorf, Covington, Ky., assignor to Wadsworth Electric Manufacturing Company, Covington, Ky., a corporation of Kentucky
Filed Apr. 1, 1964, Ser. No. 356,573
4 Claims. (Cl. 317—119)

This invention relates to circuit breakers and more particularly the invention is directed to the circuit breakers of the type used in residential distribution systems.

The circuit breaker is a unit which is designed to protect the wires of an electrical circuit from overheating by interrupting or opening the electrical circuit when the current passing through that circuit exceeds a predetermined amount for which the circuit breaker is rated. The circuit breakers are usually mounted side by side in an enclosure which is called a load center or panel board.

In most residential installations the current is fed to the load center from outside the dwelling by a three wire circuit. Two of the wires have a voltage difference between them of approximately 240 volts and the third or neutral wire provides a 120 volt supply with either of the two line wires. The line wires are connected to bus bars mounted in the load center. The bus bars have spaced contacts which are engaged by the circuit breakers of the type to which the present invention relates. In the preferred form of the invention, the contacts are in the form of blades and engagement with the blades is made by contact jaws on the circuit breaker which frictionally grip the contact blades when the circuit breakers are mounted in the load center. These blades are normally lined up side by side in the center of the load center and alternate blades are connected to the respective line buses so that each blade is separated from its adjacent blade by 240 volts.

For the purpose of installing the circuit breaker, the enclosure has means for engaging one corner on the end of the circuit breaker opposite the jaw contacts so that the circuit breaker can be mechanically held at one corner and pivoted into engagement with the line contacts. Each circuit breaker has a load terminal in the form of a screw, solderless connector or the like to which the conductor of a load circuit is attached.

In the system thus far described it is possible to have as many distribution circuits as there are blades or line contacts in the load center. Recently there have been attempts to double the number of distribution circuits and circuit breakers which can be connected to a single line contact. To do so, will not represent any particular saving in circuit breaker cost. There are, however, two very good reasons for providing the double circuit breaker system for a single line contact. First, in load centers which accommodate only one circuit breaker for a single line contact, if it is desired to add a circuit it is necessary either to add an additional load center or to remove the existing load center, requiring a disconnecting of all of the circuits, and to install a load center having a greater number of line contacts. These disadvantages are eliminated where it is possible to apply two circuit breakers in the space normally occupied by a single circuit breaker, thereby permitting the installation of two distribution circuits where there had previously been one.

Second, there is a saving in the cost of a smaller cabinet. In a housing development where a large number of homes which are substantially identical are being built, the contractor may find it advantageous to install the electrical circuits using a small load center and connecting two distribution circuits to each line contact. In this way the developer may save several dollars for each load center through the use of a small load center even though there is no saving in the cost of the circuit breaker per se.

Previous attempts have been made to double the capacity of load circuits that have fixed line contacts by compactly combining two circuit breakers into a single casing of approximately the same size as a conventional breaker so that this unit can be attached to a fixed line contact and serve two electrical circuits. However, these combined circuit breaker units have heretofore been inseparably combined in a single casing. This solution has created other problems. For instance, the inventory of such circuit breakers that an electrical contractor is required to stock is greatly increased due to the many combinations of two different capacity single circuit breakers. For example, if four conventional circuit breakers of different capacities are usually stocked, sixteen inseparably combined units would have to be stocked to supply all of the possible capacity combinations. Another inherent disadvantage of two inseparably combined circuit breakers is the increased replacement cost should only one circuit breaker fail, thereby requiring the replacement of the entire unit. This disadvantage prevails also during manufacture. If during inspection one half of the unit is found to be defective the complete unit may have to be disassembled and rebuilt including the fully operative breaker.

It has therefore been an objective of my invention to provide two separate circuit breakers that can be easily combined and quickly attached as a unit to one fixed line contact but, to provide such a unit that can be disconnected from the contact and the circuit breakers easily separated. Such an objective has been attained by providing a means to join and align two separate, thin circuit breakers which have identical casings whose combined width is substantially the same as one single, conventional circuit breaker. Thus the circuit load capacity of a load center having fixed line contacts is doubled with my breaker unit as compared with the use of a single conventional circuit breaker. This not only increases the circuit capacity of new panel assemblies but alleviates the problem of having to add another load center to increase the circuit capacity in an existing building that has an operable load center with fixed line contacts.

The novel combination of the thin circuit breakers is accomplished through the use of two components in the following manner: means are secured to a line terminal on each breaker thereby holding the two breakers together while at the same time providing each breaker with means for connecting it to the fixed contact and, removable means for joining the rear ends of the circuit breakers. Two circuit breakers can be easily united by these means and are quickly separable. Consequently, the inventory that an electrical contractor would otherwise be required to maintain if he stocked the old, inseparable units is substantially decreased since all the contractor must stock is a supply of the individual circuit breakers of various capacities which can be assembled to meet his requirements. Furthermore, replacement costs are decreased since individual circuit breakers may be replaced.

Although the features already mentioned are probably the most apparent advantages of my circuit breaker unit, others that are not quite so obvious are equally as important. For instance, an insulative shield secured to the front of the breakers insulates one circuit breaker in the unit from the other. Furthermore, the shield also insulates one breaker unit from another by eliminating the possibility of current jumping from one breaker unit to another due to the close proximity of the installed breaker units in the load center. Without this shield the presence of foreign material or a voltage difference between the two breaker units could cause a short circuit between the units. Additionally, the shield helps to maintain the connection and alignment of the two breakers and prevents any stressing of the line contacts as might tend to distort them.

It has been another objective of the invention to provide non-interchangeability means on each load end of the circuit breakers, the means on paired breakers cooperating with each other, and with receiving means on the panel board assembly, to determine the maximum rating or capacity of a circuit breaker that may be installed in the load center so that through inadvertance or by a willful attempt, an improper breaker unit may not be installed. It can be readily appreciated that the consequences of such a substitution could be very serious.

It has been another objective to maintain the non-interchangeability objective just referred to but to provide non-interchangeability means on the circuit breakers comprising the unit and receiving means on the panel board so that a single, conventional circuit breaker of an improper circuit capacity and having a capacity determining means such as the alternative embodiment of the invention disclosed in Middendorf et al., Patent No. 3,089,063, may not be substituted for the unit. This objective embraces the provision of non-interchangeability structure applied to paired circuit breakers which is completely compatable with the existing single breaker system disclosed in Patent No. 3,089,063.

Figures 2, 3:
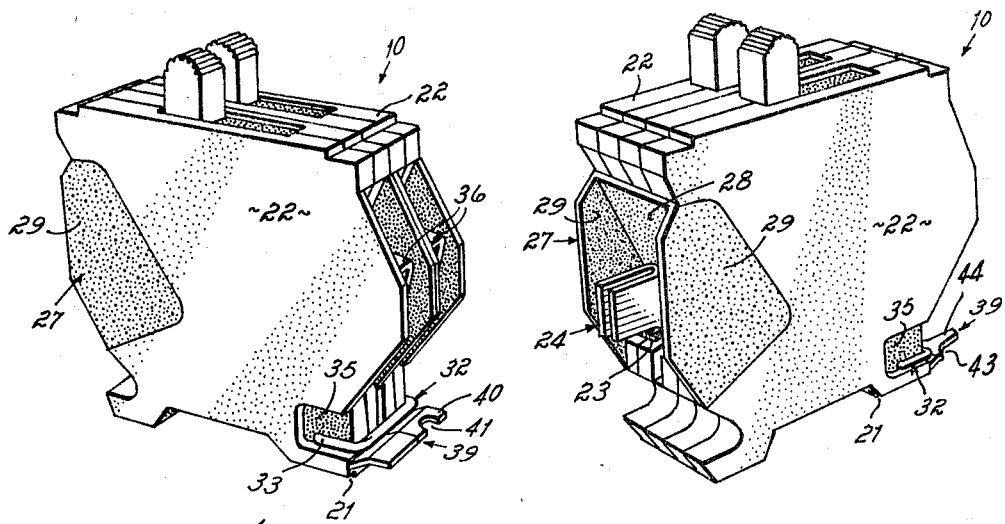

The various features and advantages of the present invention will be more clearly apparent to those skilled in the art from the following detailed description taken in conjunction with the drawings in which:

FIG. 1 is a perspective view showing a circuit breaker unit and a conventional circuit breaker employed in a load center, FIG. 2 is a perspective view of a circuit breaker unit particularly showing the load end of the unit and one embodiment of a rate determining member, FIG. 3 is a perspective view of a circuit breaker unit particularly showing the line end of the unit and another embodiment of a rate determining member, FIG. 4 is a disassembled perspective view of the circuit breaker unit, FIG. 5 is a side elevational view of the circuit breaker unit, FIG. 6 is a side elevational view partly in section of a circuit breaker that may be used in the breaker unit, FIG. 7 is a cross sectional view taken along the lines 7—7 of FIG. 5, FIG. 8 is a fragmentary plan view showing several circuit breaker units inserted in a panel assembly wherein the terminal blades are disposed on both sides of a line bus, FIG. 9 is a fragmentary plan view showing rating determining members and the proper placement of irreversible screws in a bracket to receive the rate determining members, FIG. 10 is a diagrammatic view of the circuit breakers' recesses shown in FIG. 9 accompanied by a chart showing the capacity of the circuit breakers that may be substituted for the breakers shown in FIG. 9, and FIG. 11 is a diagrammatic view showing alternative rating determining members for breaker units accompanied by a chart showing the capacity of the circuit breakers that may be substituted for the breakers indicated.

A circuit breaker unit 10, constructed in accordance with the present invention and inserted in a load center 11, is illustrated in FIG. 1.

The load center 11 is constructed in a conventional manner and may be similar to the one disclosed in Middendorf et al., Patent No. 3,089,063. The load center 11, comprises an enclosure or cabinet 12, a cover having knock outs (not shown) and a panel board 13 formed by a metal plate.

The panel board 13, is mounted in the enclosure 12 in a conventional manner. Secured to the panel board 13 by any suitable means, such as clamp members struck from the plate, in a block of insulative material forming a bus mount 14. A pair of line buses 15 are secured to the bus mount 14 and each bar has an integral terminal 16 for receiving the incoming line. Spaced terminal blades 17 project from the line buses 15 at a plurality of locations to receive the line ends of circuit breaker units 10.

Substantially parallel to the line buses 15 and spaced therefrom a distance of about the length of the breaker units 10 is a bracket 18 which is an integral extension of the panel board 13 and which has a flange 19 that provides an engagement means for the load end of a circuit breaker unit 10, more specifically described below.

Receiver slots 20 are formed as an integral part of the panel board 13 below the flange 19, and provide a receiving and aligning means for the recessed portions 21 of the load end of the circuit breaker units 10 when they engage a terminal blade 17.

The preferred embodiment of the circuit breaker unit 10 is best shown in FIG. 4 and comprises two thin circuit breakers 22 each having a conventional interior mechanism. At the line end of each circuit breaker 22 is a flat, generally horizontal line contact 23. The line contacts 23 are connected to a U-shaped jaw 24 by a pair of ears 25, configurated to lie against the line contacts 23. When the ears are secured to the line contacts 23 by screws 26 the jaw 24 projects substantially perpendicularly from the circuit breaker unit 10 and can embrace a terminal blade 17. The jaw 24 so described already performs two functions, it embraces the terminal blade 17 to provide an electrical contact between the line contacts 23 and the line bus 16, and it connects the line ends of the circuit breakers 22. However, the jaw 24 performs still another important function, it secures an insulative barrier or shield 27 to the circuit breakers 22 which in turn not only is responsible for preventing undesired electrical contacts but helps to establish and maintain the alignment of the circuit breakers 22.

The insulative shield 27 has a front plate 28 that rests against the line ends of each circuit breaker 22 when the breakers are positioned side by side. A pair of flanges 29 extend perpendicularly from each end of the front plate 28 and embrace the sides of the circuit breakers 22 adjacent to the line end. Each of these flanges 29 engage cutouts 30 which are formed in each line end side of the circuit breaker 22. The shield 27 also has a projection 31 extending perpendicularly from the middle of the front plate 28 so that it can engage the other two cutouts 30 of the circuit breakers 22. The depth of the cutouts 30 is such that when the front plate 28 lies against the line ends of the circuit breakers 22 and the projection 31 engages the cutouts 30 the inner sides of the circuit breakers 22 forming the unit 10 are slightly separated thereby permitting heat dissipating air to pass between the breakers and to prevent one breaker from overheating the adjacent breaker and causing it to trip below its rating. The flanges 29 also extend in the opposite direction from the direction previously described so that the line contacts 23 of a circuit breaker unit 10 are insulated from another such unit which is positioned immediately next to it. This is of particular importance in an assembly such as the one shown in FIG. 8 where there is a substantial potential difference, e.g., 240 volts between adjacent line contacts. The insulative shield 27 also maintains the alignment of the two circuit breakers 22 since after the insulative flanges 29 and the insulative projections 31 engage the cutouts 30 and the U-shaped jaw 24 is secured, any transverse movement of one breaker 22 with respect to the other breaker 22 in the unit is largely eliminated. Thus any strain on the line jaws 24 which might have been produced by relative circuit breaker movement is eliminated.

The load ends of the circuit breakers 22 are held together by a removeable G-shaped clip 32 which also serves as a means to prevent the transverse twisting of the breakers 22 when they are combined. The hook portion 33 of the clip 32 engages a hole 34 formed in each circuit breaker 22 at a recess 35 formed at each load end side of the breakers 22. The other end of the G-shaped clip 32 lies in the recess 35 formed in the adjoining breaker 22.

As best shown in FIG. 2 the load end of each circuit breaker 22 is provided with a conventional solder-less connector contact 36 similar to the one disclosed in Middendorf et al., Patent No. 2,956,133. This load contact is comprised generally of a load terminal, not shown, and a screw, not shown, that is engageable with the terminal and adapted to secure a load wire to the circuit breaker 22.

As shown in FIGS. 9 and 11, either of two rating determining members 39 may be secured to the load end of each circuit breaker 22 to frustrate an attempt to replace a breaker having a proper amperage capacity with one having a higher capacity if such a replacement might be dangerous. Throughout the remaining paragraphs reference will be made to the proper amperage breaker as being the "low" capacity breaker and the breaker that should not be used as a replacement for the "low" capacity breaker as being the "high" capacity breaker. For further exemplary purposes, a "low" capacity breaker is shown in FIGS. 9–11 to be one having a capacity of fifteen or twenty amperes, and a "high" capacity to be one having a capacity of thirty amperes or above. However, these amperage definitions are given by way of example only and not for purposes of limitation.

One type of these rating determining members 39 is shown in FIGS. 2 and 9, and has as its function the prevention of the replacement of one or more circuit breakers 22 of a low capacity, with other breakers 22 of a high capacity. The member 39 on all capacity breakers 22 has a flange 40, but semi-circular recesses 41 are cut in the flange 40 of only the low capacity breaker 22. Cooperating with the semi-circular recesses 41 is an irreversible screw 42 that projects downwardly through the flange 19 of the bracket 18. The screw 42 is only inserted in the flange 19 when a low capacity breaker 22 is originally installed. Thereafter, the screw 42 will prevent the substitution of a higher capacity breaker 22 for the low capacity one since the projecting member 39 of a higher capacity breaker 22 does not have semi-circular recesses 41 that are engageable with the screw 42. FIG. 10 shows the various circuit breakers that may be substituted for the breakers shown in FIG. 9.

An alternative embodiment of a rating determining member 39 is best shown in FIGS. 3 and 11, and has as its function the prevention of the replacement of one or more low capacity breakers 22 in a unit 10 with a breaker having a high capacity; and the prevention of the substitution of a conventional circuit breaker of a high capacity which also has a rate determining means like those disclosed in FIGS. 6–10 of Middendorf et al. Patent No. 3,089,063.

The member 39 on both the low and high capacity breaker 22 has a flange 40 that has quarter recesses 43 at its edges. However, the flange 40 of a high capacity breaker extends beyond that of the low breaker and this extension forms a tongue-like projection 44. When two circuit breakers 22 having quarter recesses 43 are placed side by side the quarter recesses 43 cooperate to form a semi-circular recess that can engage an irreversible screw 42 that projects downwardly through the flange 19 of the bracket 18. However, before the quarter recesses 43 of a high capacity breaker 22 can engage the screw 42 a knock out 45 (FIG. 1) in the bracket 18 must be removed to accommodate the tongue-like projection 44. Not only will these rate determining means just described prevent the substitution of a high capacity breaker 22 for a low capacity breaker 22 that was originally installed but it prevents the substitution of a high capacity conventional circuit breaker such as the one disclosed in the patent referred to above, since the irreversible screw 42 that engages the quarter recesses 43 of the breakers 22 will only permit the installation of a low capacity single circuit breaker of the type referred to.

To assemble the breaker unit 10 from the component parts as shown in FIG. 4, the hook portion 33 of the G-shaped wire 32 is inserted into the hole 34 in one of the breakers 22. Next, another breaker 22 with the shield 27 in its proper position and held by the jaw 24 is longitudinally inserted along the breaker bearing the G-shaped wire 32. Then, the jaw 24 is attached to the first breaker 22 to form a unit 10. The double breaker unit is then ready to be installed in a load center in the usual way by sliding the jaw 24 over the terminal blade 17 while the load end of the unit rests in the receiver slot 20.

Having thus described and explained the details and objectives of my invention I claim:

1. A circuit breaker unit comprising:

two circuit breakers having identical casings, line terminals at one end and load terminals at the other end, removable means connecting the line ends of said circuit breakers when said circuit breakers are positioned side by side including an electrical connector having ears connected to said line terminals of each circuit breaker, and a portion adapted to make electrical contact with a bus bar conductor, removable means connecting the load ends of said circuit breakers when said circuit breakers are positioned side by side including a clip engageable with the load end of each circuit breaker, and a removable insulative shield having side flanges projecting from said casings along each side of said electrical connector thereby providing insulation of the electrical connector from the line contacts of an adjacent circuit breaker.

2. A circuit breaker unit comprising, two circuit breakers having separate and identical casings, line terminals on the line ends of each of said circuit breakers, a U-shaped jaw, ears on said jaw engageable with the line terminals of each circuit breaker, said ears and jaw connecting and maintaining said circuit breakers in a side by side position, a removable G-shaped wire clip engageable with the load end of each of said circuit breakers connecting and maintaining said breakers in a side by side position, and an insulative shield, said shield engageable with each line end side of said circuit breakers, said shield held in an engagement position with each line end and with each line side of each of said circuit breakers by said U-shaped jaw, said shield separating said circuit breakers, one from the other.

3. A circuit breaker unit comprising, two circuit breakers having separate and identical casings, line terminals on the line ends of each of said circuit breakers, a U-shaped jaw, ears extending from said jaw, said ears engageable with the line terminals of each circuit breaker, said ears and jaw connecting and maintaining said circuit breakers in a side by side position, a removable wire clip engageable with the the load end of each of said circuit breakers, said clip connecting and maintaining said breakers in a side by side position, an insulative shield having a front plate adapted to lie against the line ends of said circuit breakers when said circuit breakers are in a side by side position, said insulative shield having insulative flanges extending perpendicularly from the ends of said front plate, said flanges being parallel to said circuit breakers when said front plate lies against the line ends of said circuit breakers, and said shield having an insulative separating projection extending from said front plate, said projection extending toward the load end of said circuit breakers when said front plate lies against the line ends of said circuit breakers and when said flanges are parallel to the line end sides of said circuit breakers.

4. A circuit breaker unit comprising, two circuit breakers having separate and identical casings, said circuit breakers having a recess in each side adjacent to the line end, line terminals on the line ends of each of said circuit breakers, a U-shaped jaw, ears extending from said jaw, said ears engageable with the line terminals of each circuit beaker, said ears and jaw connecting and maintaining said circuit breakers in a side by side position, a removable wire clip engageable with the load end of each of said circuit breakers, said clip connecting and maintaining said breakers in a side by side position, an insulating shield having a front plate adapted to lie against the line ends of said circuit breakers when said circuit breakers are in a side by side position, said insulating shield having insulative flanges extending perpendicularly from the ends of said front plate, said flanges being parallel to said circuit breakers when said front plate lies against the line ends of said circuit breakers, each of said flanges engaging a recess in each of said circuit breakers, said insulating shield having an insulative separating projection extending from said front plate, said projection extending toward the load end of said circuit breakers when said front plate lies against the line ends of said circuit breakers and when said flanges are parallel to the line end side of said circuit breakers, said insulative projection engaging a recess in each circuit breaker in such a manner that the circuit breakers do not abut, and said U-shaped jaw engaging and holding said front plate against the line ends of the circuit breakers when said ears engage said line terminals.

References Cited by the Examiner

UNITED STATES PATENTS

| | | | |
|---|---|---|---|
| 2,723,327 | 11/1955 | Gilbert | 200—168 |
| 2,765,382 | 10/1956 | Kelto | 200—168 |
| 2,922,004 | 1/1960 | Miller et al. | 200—116 X |
| 2,974,259 | 3/1961 | Cole | 317—119 |
| 3,095,524 | 6/1963 | Leonard et al. | 200—116 X |
| 3,146,379 | 8/1964 | Giger | 317—119 |

FOREIGN PATENTS 1,039,597    9/1958    Germany.

ROBERT K. SCHAEFER, *Primary Examiner.*

ROBERT S. MACON, *Examiner.*